(12) United States Patent
Wolf

(10) Patent No.: US 10,807,655 B2
(45) Date of Patent: Oct. 20, 2020

(54) FRONT DIFFUSER FOR A VEHICLE

(71) Applicant: Dr. Ing. h.c. F. Porsche Aktiengesellschaft, Stuttgart (DE)

(72) Inventor: Thomas Wolf, Leonberg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 50 days.

(21) Appl. No.: 16/191,475

(22) Filed: Nov. 15, 2018

(65) Prior Publication Data
US 2019/0168826 A1 Jun. 6, 2019

(30) Foreign Application Priority Data
Dec. 5, 2017 (DE) .................. 10 2017 128 791

(51) Int. Cl.
| | | |
|---|---|---|
| *B62D 35/00* | (2006.01) | |
| *B62D 37/02* | (2006.01) | |
| *F16D 65/847* | (2006.01) | |
| *F16D 65/807* | (2006.01) | |
| *F16D 65/827* | (2006.01) | |
| *B60T 5/00* | (2006.01) | |
| *B62D 35/02* | (2006.01) | |

(52) U.S. Cl.
CPC .......... *B62D 35/005* (2013.01); *B62D 37/02* (2013.01); *B60T 5/00* (2013.01); *B62D 35/02* (2013.01); *F16D 65/807* (2013.01); *F16D 65/827* (2013.01); *F16D 65/847* (2013.01)

(58) Field of Classification Search
CPC ..... B62D 35/005; B62D 35/007; B62D 37/02
USPC ....................................................... 296/180.5
See application file for complete search history.

(56) References Cited

U.S. PATENT DOCUMENTS

| | | | |
|---|---|---|---|
| 9,102,366 B1 * | 8/2015 | Kim ..................... | B62D 35/005 |
| 2015/0232138 A1 * | 8/2015 | Parry-Williams ........ | G05D 3/00 |
| | | | 296/180.5 |
| 2015/0353148 A1 * | 12/2015 | Wolf .................... | B62D 35/007 |
| | | | 296/180.5 |
| 2015/0353149 A1 * | 12/2015 | Wolf .................... | B62D 35/007 |
| | | | 296/180.5 |
| 2017/0151984 A1 * | 6/2017 | Bray .................... | B62D 35/005 |
| 2018/0057078 A1 * | 3/2018 | Wiech ................... | B62D 37/02 |
| 2018/0264933 A1 * | 9/2018 | Laurent ................ | B62D 35/007 |
| 2019/0061842 A1 * | 2/2019 | Thullier ............... | B62D 35/007 |
| 2019/0152543 A1 * | 5/2019 | Shiga .................... | B62D 37/02 |

(Continued)

FOREIGN PATENT DOCUMENTS

| | | |
|---|---|---|
| EP | 2655170 B1 | 10/2013 |
| FR | 2959473 A1 | 11/2011 |

(Continued)

*Primary Examiner* — Jason S Morrow
(74) *Attorney, Agent, or Firm* — Leydig, Voit & Mayer Ltd.

(57) ABSTRACT

A front diffuser for disposal in a region of an underbody cladding of a vehicle includes a diffuser wall defining a diffuser duct having an inflow side and an outflow side and an air guide device mounted so as to be rotatable about a predefined rotation axis and configured to, by way of a rotating movement, move from a first rotary position at least partially into the diffuser duct to a second rotary position and move from the second rotary position at least partially out of the diffuser duct to the first rotary position. The air guide device is configured as a molding and includes a first external face and a second external face.

16 Claims, 3 Drawing Sheets

(56) References Cited

U.S. PATENT DOCUMENTS

2019/0202504 A1* 7/2019 Mandl .................... B62D 35/02
2020/0010128 A1* 1/2020 Herlem ................. B62D 35/02
2020/0010129 A1* 1/2020 Ikawa .................. B62D 35/005

FOREIGN PATENT DOCUMENTS

WO      WO 2017085375 A1    5/2017
WO      WO 2017103357 A1    6/2017

\* cited by examiner

FRONT DIFFUSER FOR A VEHICLE

CROSS REFERENCE TO RELATED APPLICATIONS

This application claims benefit to German Patent Application No. DE 10 2017 128 791.4, filed Dec. 5, 2017, which is hereby incorporated by reference herein.

FIELD

The invention relates to a front diffuser for a vehicle, in particular for a motor vehicle.

BACKGROUND

An air flow in the region of the front wheels can be influenced by way of a front diffuser so as to on account thereof influence, for example, the lift in the region of the front axle, the air resistance, the aerodynamic balance, or also the ventilation of the brakes. To this end, the air flow in the case of active front diffusers is influenced in a variable manner, for example by way of a displaceable wall. A diffuser has an open or closed diffuser duct, the cross section of the latter usually increasing from an inflow side to an outflow side.

EP 2 655 170 B1 shows a motor vehicle having a floor panel in which a cooling air duct for cooling a brake device is configured. The cooling air duct is assigned an adjustable closure element in the form of a closure plate by way of which the cooling air duct can be opened or closed.

WO 2017/085375 A1 shows an active diffuser having a deflector and an actuator element which influences the position of the deflector.

WO 2017/103357 A1 shows a diffuser having a deflector which is rotatably mounted.

FR 2 959 473 A1 shows a motor vehicle having a flow profile which is disposed in front of a wheel and of an assigned brake. The flow profile is movable between different positions.

SUMMARY

In an embodiment, the present invention provides a front diffuser for disposal in a region of an underbody cladding of a vehicle. The front diffuser includes a diffuser wall defining a diffuser duct having an inflow side and an outflow side and an air guide device mounted so as to be rotatable about a predefined rotation axis and configured to, by way of a rotating movement, move from a first rotary position at least partially into the diffuser duct to a second rotary position and move from the second rotary position at least partially out of the diffuser duct to the first rotary position. The air guide device is configured as a molding and includes a first external face and a second external face. The first external face in the first rotary position faces the diffuser duct and extends from the rotation axis toward the outflow side, and the first external face in the second rotary position faces the inflow side, and the second external face on an external periphery of the first external face adjoining the first external face. The second external face in the second rotary position faces the outflow side, and the second external face, at least in portions, does not run parallel with the first external face.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
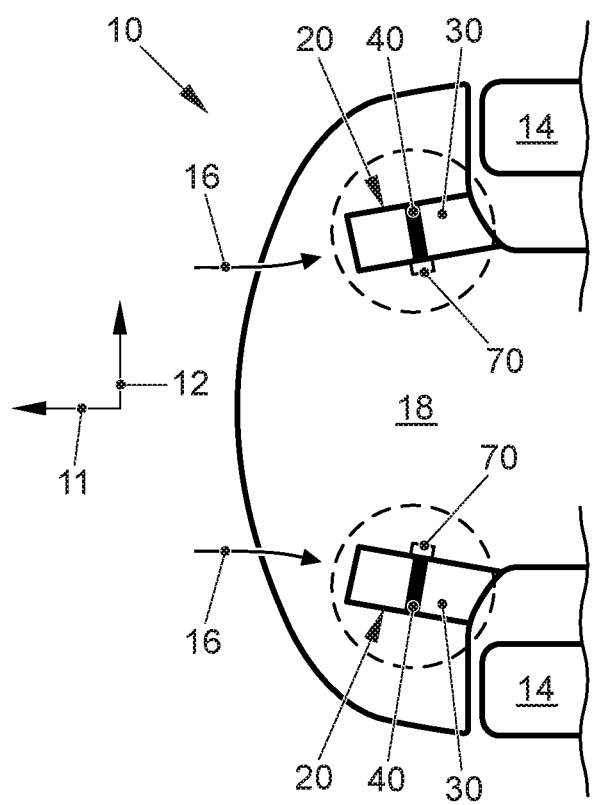
FIG. 1 shows a vehicle having two front diffusers from below in a schematic illustration.

Embodiments of the invention to provide a new front diffuser.

A front diffuser for disposal in the region of an underbody cladding of a vehicle has a diffuser wall and an air guide device, said diffuser wall defining a diffuser duct having an inflow side and an outflow side, said air guide device being mounted so as to be rotatable about a predefined rotation axis and by way of a rotating movement being movable from a first rotary position at least partially into the diffuser duct to a second rotary position, and being movable from the second rotary position at least partially out of the diffuser duct to the first rotary position, said air guide device being configured as a molding and having a first external face and a second external face, said first external face in the first rotary position facing the diffuser duct and extending from the rotation axis toward the outflow side, and said first external face in the second rotary position facing the inflow side, and said second external face on an external periphery of the first external face adjoining the first external face, said second external face in the second rotary position facing the outflow side, and said second external face at least in portions not running parallel with the first external face.

In the case of such a front diffuser the movable part is comparatively small, and the front diffuser requires little space. Comparatively minor actuating forces are required for adjusting.

According to one preferred embodiment the transition between the first external face and the second external face has a kink. A kink in this region has proven advantageous in terms of aerodynamics since said kink facilitates peeling of the flow on the air guide device.

According to one preferred embodiment the second external face at least in portions is configured so as to be convex. On account thereof the molding is imparted an aerodynamically favorable shape. As compared thereto, the configuration of the air guide device as a plate has in particular led to a poorer result in aerodynamic terms, since the flow has again borne on the diffuser wall after a short distance behind the air guide device.

According to one preferred embodiment the second external face at least in portions has a circular cross section. This enables a tight gap between the air guide device and the diffuser wall.

According to one preferred embodiment the geometric center of the circular cross section lies at least partially on the rotation axis. On account thereof the gap between the air guide device and the diffuser wall can be configured so as to be very small.

According to one preferred embodiment the front diffuser has two side walls, said side walls being disposed on the axial sides of the air guide device. A defined termination on the axial sides is provided by the side walls in aerodynamic terms.

According to one preferred embodiment at least that region of the air guide device that in the second rotary position is disposed in the diffuser duct has a compact surface. Any contamination in the interior of the air guide device is avoided on account thereof, on the one hand, and this is advantageous in terms of acoustics, on the other hand.

According to one preferred embodiment the front diffuser has a housing region, said housing region being configured for at least partially receiving the air guide device in the first rotary position. On account thereof, the air guide device can at least be partially rotated out of the diffuser duct into the housing region.

According to one preferred embodiment the first external face at least partially covers the housing region when the air guide device is in the first rotary position. Coarse dirt can thus be kept away from the housing region.

According to one preferred embodiment the air guide device is rotatable into the diffuser duct so far that the first lateral face projects from the diffuser wall at an angle which is in the range from 70° to 110°. The angle is furthermore preferably in the range from 80° to 100°, and particularly preferably said angle is in the range from 85° to 95°. Positive peeling of the flow by way of the air guide device was able to be achieved in the case of these angular ranges.

According to one preferred embodiment the air guide device is configured as a hollow body or as a solid body. The configuration as a hollow body has advantages in terms of weight; the configuration as a solid body is simpler in terms of production.

According to one preferred embodiment the front diffuser has an actuator, said actuator being configured to cause a controlled rotation of the air guide device about the rotation axis. This enables an automatic movement of the air guide device by way of the actuator.

According to one preferred embodiment a vehicle has an underbody cladding, and in the case of the vehicle at least one front diffuser, preferably two front diffusers, is/are disposed on the underbody cladding. On account thereof the vehicle can be improved in aerodynamic terms.

FIG. 1 shows a vehicle 10, in particular a motor vehicle having an internal combustion engine or an electric drive, from below. An arrow 11 indicates the longitudinal direction of the vehicle, in the present case the travel direction of the vehicle 10, and an arrow 12 indicates a transverse direction which is perpendicular to the longitudinal direction 11. The vehicle 10 has wheels of which two front wheels 14 are illustrated, and an underbody cladding 18. Two front diffusers 20 are provided in front of the front wheels 14. The front diffusers 20 in the exemplary embodiment run somewhat obliquely in relation to the longitudinal direction 11 since the air flow 16, or in more general terms the fluidic flow, respectively, in the external regions of the underbody cladding 18 runs in a slightly outward manner. The front diffusers 20 are preferably disposed in the direction of the air flow 16. The front diffusers 20 have in each case one diffuser duct 30 and one air guide device 40 which is movable into the diffuser duct 30. In each case one controllable actuator 70 is provided for the movement of the air guide device 40, said actuator 70 being an electric motor or a hydraulic actuator, for example.

Figure 2:
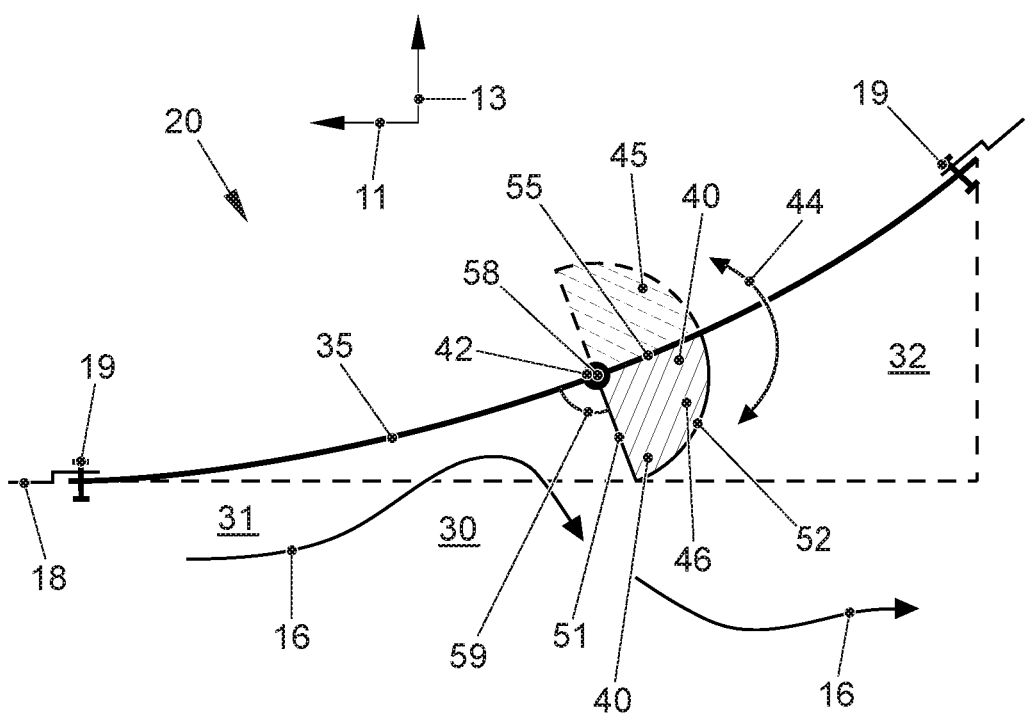
FIG. 2 shows a section through the front diffuser of FIG. 1, in the flow direction in a schematic illustration.

FIG. 2 shows the front diffuser 20 of FIG. 1 in a schematic illustration. The longitudinal direction 11 and the height direction 13 are indicated in the illustration. The front diffuser 20 has a diffuser wall 35 for configuring the diffuser duct 30 which in the exemplary embodiment at least in regions is configured so as to be open, in particular toward the road surface. The diffuser wall 35 is disposed on the underbody cladding 18 of the vehicle 10 and is preferably connected to said underbody cladding 18 by way of connection means 19 (screws, rivets, etc.). An inflow side 31 and an outflow side 32, both predefined by the diffuser duct 30, are indicated in the illustration, and likewise a potential profile of the air flow 16 in the region of the front diffuser 20. The air guide device 40 is mounted so as to be rotatable about a predefined rotation axis 42, and said air guide device 40 by way of a rotating movement 44 can be moved from a first rotary position 45, illustrated by dashed lines, into the diffuser duct 30 to a second rotary position 46, or can be moved from the second rotary position 46 out of the diffuser duct to the first rotary position 45. It can be provided in the case of simple applications that the air guide device 40 after being moved is located either in the first rotary position 45 or in the second rotary position 46. However, it is also possible for further intermediate rotary positions to be provided so as to cause more finely graded settings.

The air guide device 40 is configured as a molding, said air guide device 40 thus maintaining the basic shape thereof in the absence of the effect of extreme forces. Minor changes such as arise, for example, by temperature differences, are not critical. The air guide device 40 has a first external face 51 and a second external face 52, wherein the first external face 51 extends from a periphery of the second external face 52 in the direction toward the rotation axis. The first external face 51 herein can be flat or slightly curved. Said first external face 51 preferably has a shape which in the first rotary position 45 hugs the shape of the diffuser wall 35 such that the first external face 51 at least in regions is flush with the diffuser wall 35. To this end a curvature of the first external face 51 can be required, said curvature in most instances only being slight. Any small offset and small unevenness are not critical.

The second external face 52 in the exemplary embodiment is configured as a cylindrical face having a circular cross section. The term cross section in the present case refers to a section that is transverse to the rotation axis 42. The configuration of the second external face 52 at least in portions as a cylindrical face has the advantage that the spacing of the second external face 52 from the diffuser wall 35 remains substantially the same in the case of a rotation of the air guide device 40. On account thereof the risk of, for example, a stone being able to make its way between the air guide device 40 and the diffuser wall 35 through to the upper region can be minimized.

The air flow 16 which without the air guide device 40 would run along the diffuser wall 35 from left to right is deflected by the first external face 51, and the velocity of the air flow 16 is reduced. The flow collapses.

Tests have demonstrated that a configuration of the air guide device 40 as a disk, without the volume that is created by the second external face 52, would again flow back to the diffuser wall 35 after a short distance behind the air guide device. The design embodiment of the air guide device 40 as a voluminous body has proven advantageous for a deflection of the air flow 60.

The transition from the first external face 51 to the second external face 52 is configured as a kink. Tests have demonstrated that a smooth transition from the first external face 51 to the second external face 52 would lead to the air flow 16 not peeling away from the air guide device 40, or at least peeling away therefrom to a lesser extent.

In terms of air guidance, with a view to the contamination, and in terms of stability, it has proven advantageous for the air guide device 40 at least in that region that in the second rotary position 46 is disposed in the diffuser duct 30 to have a compact surface. The air guide device 40 in the present exemplary embodiment in the cross section on the external side has a shape that substantially corresponds to a quadrant of a circle. Of course, the angle between the first external face 51 and the third external face 55 does not have to be 90°, but said angle preferably lies in the range from 80° to 120°, furthermore preferably in the range from 85° to 110°, and particular preferably in the range from 87° to 100°.

In the case of a configuration of the air guide device 40 having a circular cross section, the geometric center 58 of the circular cross section is preferably chosen in such a manner that said geometric center 58 lies at least partially on the rotation axis 42. On account thereof, the spacing of the air guide device 40 from the diffuser wall 35 in the case of a rotary movement can be kept largely constant.

Figure 3:
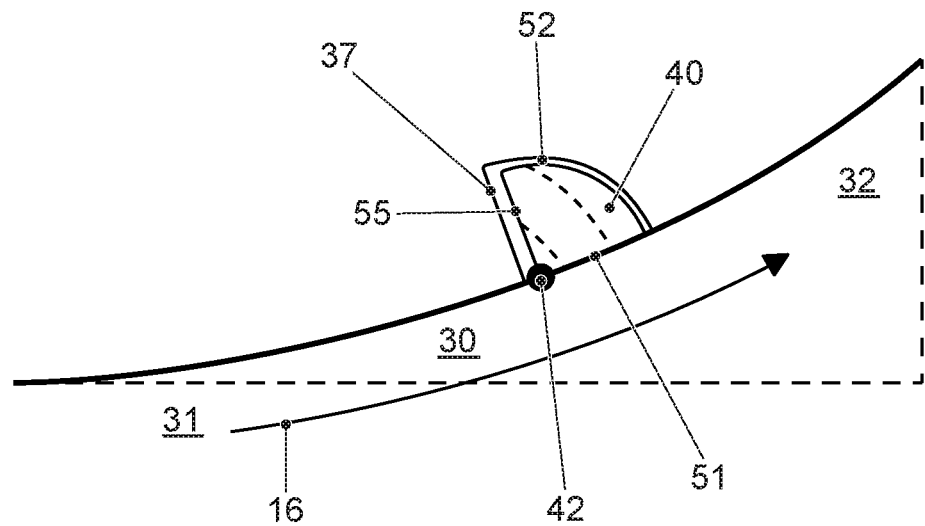
FIG. 3 shows a section through the front diffuser of FIG. 1, in the flow direction in a schematic illustration.

FIG. 3 shows the front diffuser 20 in the first rotary position, thus in the folded-in state. The air guide device 40 has been rotated largely out of the diffuser duct 30. The first external face 51 points toward the diffuser duct 30 and in the exemplary embodiment bears largely flush on the diffuser wall 35. The air flow 16 can flow through the diffuser 30 without any variation and at a high velocity. The front diffuser 20 has a housing region 37, and the air guide device 40 at least in portions can be rotated into the housing region 37. Improved sealing of the internal side of the front diffuser 20 in relation to the side of the diffuser duct 30 is possible on account of the housing region 37. On account thereof, less or preferably no moisture or dust makes its way into that side of the front diffuser 20 that faces away from the diffuser duct 30.

Figure 4:
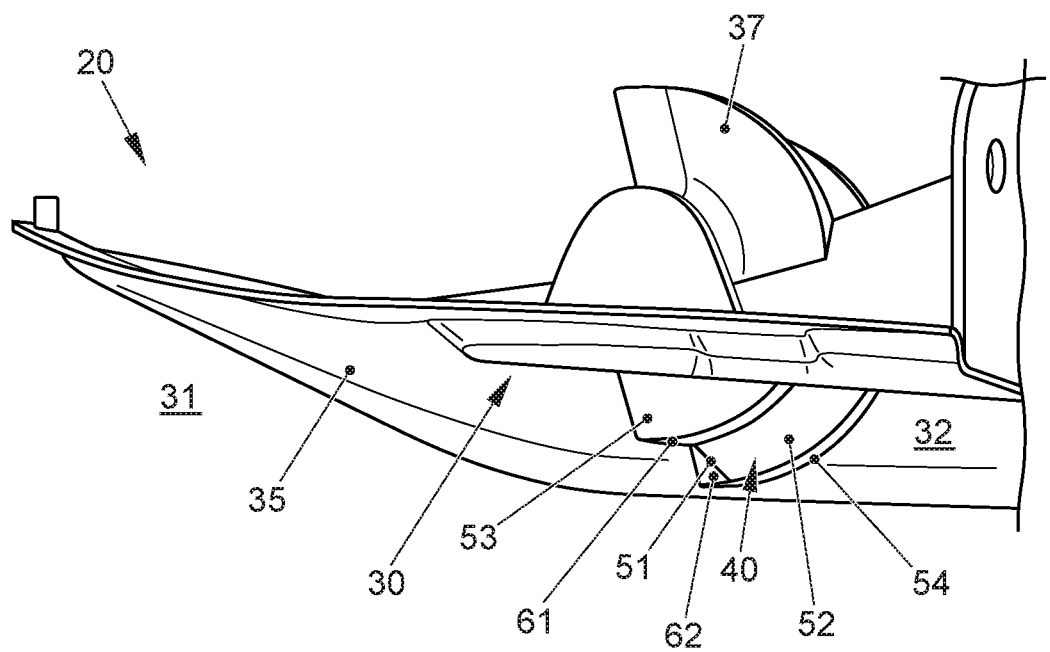
FIG. 4 shows the front diffuser of FIG. 1 in a side view.

FIG. 4 shows the front diffuser 20 from the side. The diffuser wall 35 configures the diffuser duct 30, and the diffuser wall 35 in the exemplary embodiment has an upper wall region, a first lateral wall region, and a second smaller lateral wall region. The housing region 37 is disposed on the internal side of the front diffuser 20 and protects the internal side against dust and water should the latter ingress between the air guide device 40 and the diffuser wall 35 into the housing region 37. The air guide device 40 has a first side wall 53 and a second side wall 54, said side walls 53, 54 being disposed on the axial sides of the air guide device 40. The term 'axial' herein refers to the rotation axis 42. The air guide device 40 on the axial sides of the first external face 51 has protrusions 61, 62 which extend in the direction of the inflow side 31. The protrusions 61, 62 are provided in order for the configuration of an air flow 16 which flows past the axial sides of the air guide device 40 to be reduced or prevented. The effect of the air guide device 40 is improved on account thereof.

Figure 5:
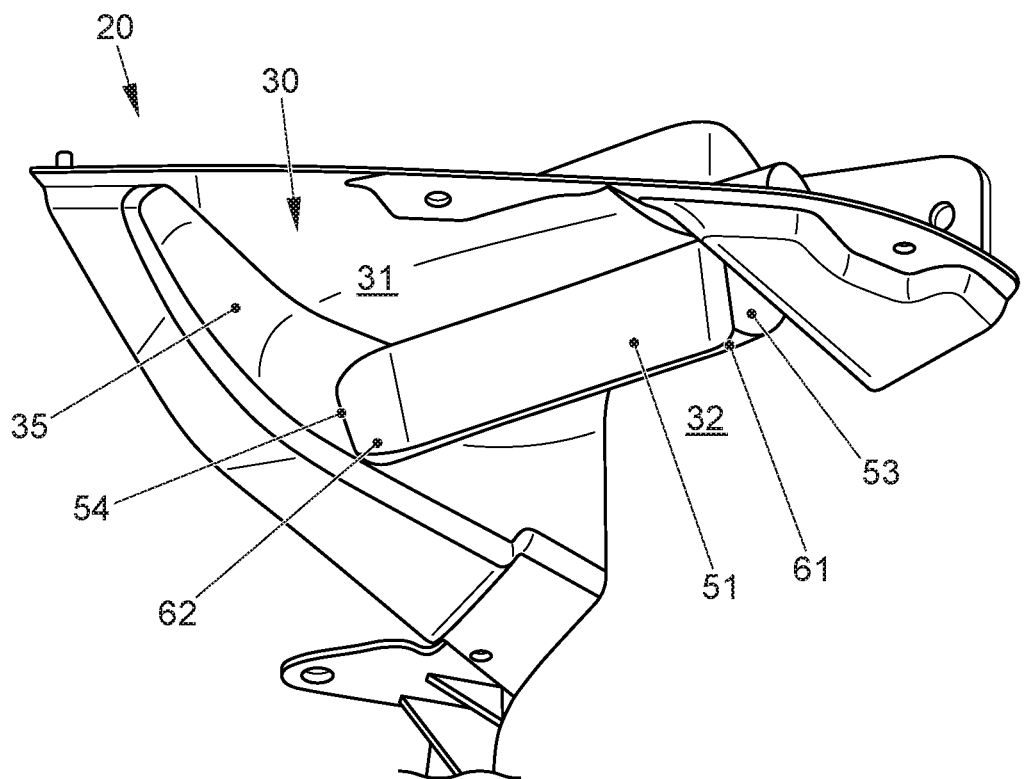
FIG. 5 shows the front diffuser of FIG. 4 in an isometric illustration obliquely from below.

FIG. 5 shows the front diffuser 20 in an isometric illustration obliquely from below. It can be readily seen that the first external face 51 faces the inflow side 31. The first external face 51 in the exemplary embodiment transitions smoothly into the protrusions 61 or 62, respectively.

Figure 6:
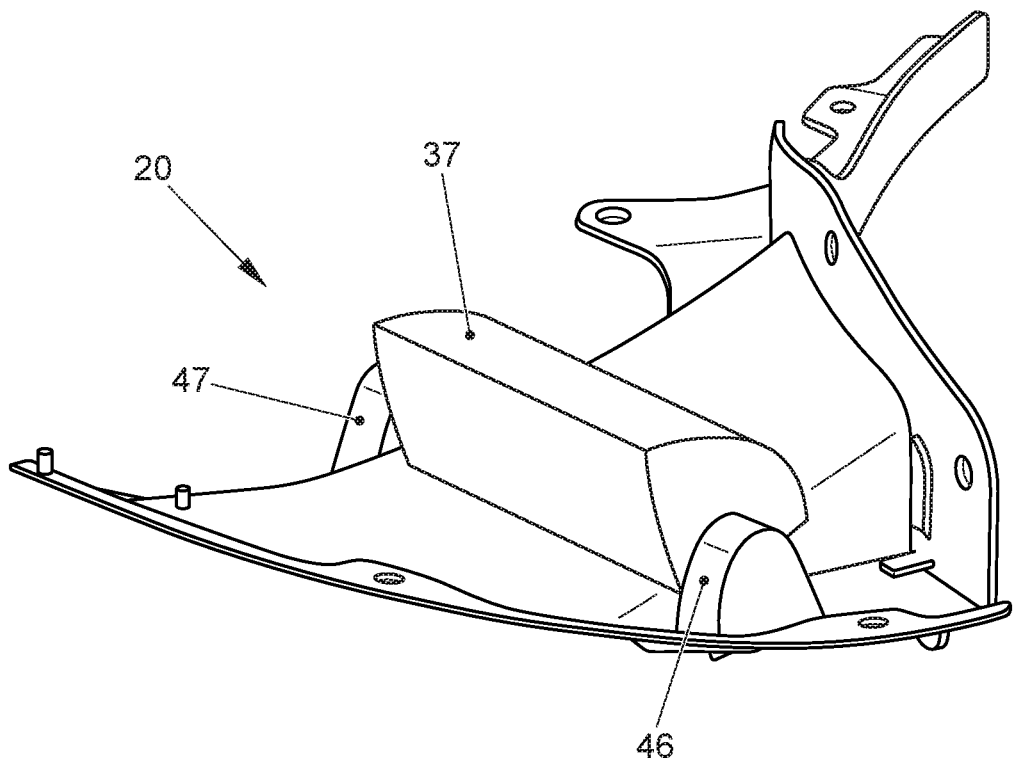
FIG. 6 shows the front diffuser of FIG. 4 in an isometric illustration obliquely from above.

FIG. 6 shows the front diffuser 20 obliquely from above. The housing region 37 enables the air guide device 40 to be folded into this housing region 37. Two bearing points 46, 47 serve for mounting the air guide device 40. Either a shaft or an axle on which the air guide device 40 is mounted can be provided herein.

Of course, diverse variations and modifications are possible within the scope of the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A front diffuser for disposal in a region of an underbody cladding of a vehicle, the front diffuser comprising:
a diffuser wall defining a diffuser duct having an inflow side and an outflow side; and
an air guide device mounted so as to be rotatable about a predefined rotation axis and configured to, by way of a rotating movement, move from a first rotary position at least partially into the diffuser duct to a second rotary position and move from the second rotary position at least partially out of the diffuser duct to the first rotary position,
wherein the air guide device is configured as a molding and includes a first external face and a second external face, wherein the first external face in the first rotary position faces the diffuser duct and extends from the rotation axis toward the outflow side, and wherein the first external face in the second rotary position faces the inflow side, and the second external face on an external periphery of the first external face adjoining the first external face, wherein the second external face in the second rotary position faces the outflow side, and wherein the second external face, at least in portions, does not run parallel with the first external face.

2. The front diffuser as claimed in claim 1, wherein the transition between the first external face and the second external face has a kink.

3. The front diffuser as claimed in claim 1, wherein the second external face at least in portions is configured so as to be convex.

4. The front diffuser as claimed in claim 1, wherein the second external face at least in portions has a circular cross section.

5. The front diffuser as claimed in claim 4, wherein a geometric center of the circular cross section lies at least partially on the rotation axis.

6. The front diffuser as claimed in claim 1, wherein the front diffuser has two side walls disposed on axial sides of the air guide device.

7. The front diffuser as claimed in claim 1, the front diffuser having a housing region, the housing region being configured for at least partially receiving the air guide device in the first rotary position.

8. The front diffuser as claimed in claim 7, wherein the first external face at least partially covers the housing region when the air guide device is in the first rotary position.

9. The front diffuser as claimed in claim 1, wherein the air guide device is rotatable into the diffuser duct so far that the first lateral face projects from the diffuser wall at an angle which is in the range from 70° to 110.

10. The front diffuser as claimed in claim 1, wherein the air guide device is configured as a hollow body or as a solid body.

11. The front diffuser as claimed in claim 1, the front diffuser having an actuator, the actuator being configured to cause a controlled rotation of the air guide device about the rotation axis.

12. A vehicle having an underbody cladding, in which vehicle at least one front diffuser as claimed in claim 1 is disposed on the underbody cladding.

13. The front diffuser as claimed in claim 1, wherein the air guide device in a cross section on an external side has a shape that corresponds to a quadrant of a circle.

14. The front diffuser as claimed in claim 1, wherein the air guide device has a third external face, an angle between the first external face and the third external face is in the rage from 80° to 120°.

15. The front diffuser as claimed in claim 1, wherein the first external face is at least partially curved.

16. The front diffuser as claimed in claim 1, wherein at least a region of the first external face is configured to be flush with the diffuser wall in the first rotary position.

* * * * *